United States Patent
Brück

(10) Patent No.: US 8,761,586 B2
(45) Date of Patent: Jun. 24, 2014

(54) ELECTRICALLY HEATABLE HONEYCOMB BODY AND METHOD FOR OPERATING IT

(75) Inventor: Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 1402 days.

(21) Appl. No.: 12/043,439

(22) Filed: Mar. 6, 2008

(65) Prior Publication Data
US 2008/0217315 A1    Sep. 11, 2008

(30) Foreign Application Priority Data

Mar. 6, 2007   (DE) .......................... 10 2007 010 758

(51) Int. Cl.
*H05B 3/60* (2006.01)
*H05B 3/78* (2006.01)
*B60L 1/02* (2006.01)
*E21B 7/15* (2006.01)

(52) U.S. Cl.
USPC ............ 392/302; 392/318; 392/456; 219/202

(58) Field of Classification Search
USPC .......... 219/162, 206, 78, 202, 504, 505, 520; 422/179; 392/302, 318, 320, 377, 456, 392/482, 502, 498, 496, 488, 485
See application file for complete search history.

(56) References Cited

U.S. PATENT DOCUMENTS

| | | | | |
|---|---|---|---|---|
| 4,870,249 A | * | 9/1989 | Kayanuma et al. | 219/206 |
| 5,119,794 A | * | 6/1992 | Kushida et al. | 123/549 |
| 5,354,540 A | | 10/1994 | Neumiller | |
| 5,393,499 A | | 2/1995 | Bagley et al. | |
| 5,768,889 A | | 6/1998 | Maus et al. | |
| 6,947,271 B1 | * | 9/2005 | Gronowicz, Jr. | 361/93.1 |
| 2003/0161766 A1 | * | 8/2003 | Bruck | 422/174 |
| 2003/0209538 A1 | * | 11/2003 | Dalton | 219/634 |
| 2005/0173394 A1 | * | 8/2005 | Bohlender et al. | 219/202 |

FOREIGN PATENT DOCUMENTS

DE   103 51 520 A1   6/2004
EP   0599323 A1   6/1994

(Continued)

*Primary Examiner* — Tu B Hoang
*Assistant Examiner* — Michael Laflame, Jr.
(74) *Attorney, Agent, or Firm* — Laurence A. Greenberg; Werner H. Stemer; Ralph E. Locher

(57) ABSTRACT

An electrically heatable honeycomb body has cavities through which a fluid can flow and contains at least one power distribution structure. The power distribution structure can be connected to a power source via a power feed line. At least one of the power feed line and the power distribution structure contains at least one closed-loop control element made of a material with a positive temperature coefficient (PTC) which can be placed at least in thermal contact with a fluid flowing through the honeycomb body. The electrically heatable honeycomb body permits, through the formation of a self-regulating closed-loop control element made for example from the PTC material, the implementation of a simple measure for performing closed-loop control on the heating power of the electrically heatable honeycomb body since the rest of the open-loop control or closed-loop control electronics can be significantly simplified or can even be dispensed with.

8 Claims, 3 Drawing Sheets

(56) References Cited

FOREIGN PATENT DOCUMENTS

| | | |
|---|---|---|
| EP | 1256699 A2 | 11/2002 |
| GB | 2 250 216 A | 6/1992 |
| JP | 1240718 A | 9/1989 |
| JP | 5312029 A | 11/1993 |
| JP | 2002028448 A | 1/2002 |
| JP | 2004176592 A | 6/2004 |
| WO | 96/10127 A | 4/1996 |

* cited by examiner

ELECTRICALLY HEATABLE HONEYCOMB BODY AND METHOD FOR OPERATING IT

CROSS-REFERENCE TO RELATED APPLICATION

This application claims the priority, under 35 U.S.C. §119, of German application DE 10 2007 010 758.9, filed Mar. 6, 2007; the prior application is herewith incorporated by reference in its entirety.

BACKGROUND OF THE INVENTION

Field of the Invention

The subject matter of the invention is an electrically heatable honeycomb body and a method for operating it. The preferred field of use of these honeycomb bodies is as a catalytic converter carrier body for conditioning the exhaust gas of internal combustion engines, in particular in the exhaust system of automobiles.

Electrically heatable honeycomb bodies are known, for example, from international patent disclosure WO-A-96/10127, corresponding to U.S. Pat. No. 5,768,889, to whose entire contents is hereby incorporated by reference herein with respect to the embodiment and the operation of the electrically heatable honeycomb body. The actuation of such an electrical honeycomb body is generally carried out by open-loop control electronics with which the power output to the electrically heatable honeycomb body is regulated.

BRIEF SUMMARY OF THE INVENTION

It is accordingly an object of the invention to provide an electrically heatable honeycomb body and a method for operating it that overcomes the above-mentioned disadvantages of the prior art devices and methods of this general type, which can be actuated more easily.

The electrically heatable honeycomb unit according to the invention has a honeycomb body with cavities, for example ducts, through which a fluid can flow, and it further contains at least one power distribution structure. The power distribution structure can be connected to a power source via a power feed line, and is distinguished in that at least one of the following components:

a) the power feed line; and
b) the power distribution structure contains at least one closed-loop control element made of a material with a positive temperature coefficient (PTC) which can be placed at least in thermal contact with a fluid flowing through the honeycomb body, for example exhaust gas.

Materials having a positive temperature coefficient, in particular what are referred to as PTC resistors, have a temperature range in which the electrical resistance rises strongly with the temperature. Such elements are also referred to as self-regulating heating resistors which maintain a specific temperature, referred to as the significant or rated temperature, by changing its electrical resistance. The power distribution structures serve to distribute the electrical current which can be input into the individual current paths formed in the interior of the honeycomb body, in particular in a heated catalytic converter or else to the walls of the cavities, which are to be heated, in the honeycomb body. The power distribution structures can form, in particular, part of the outer surface of the corresponding honeycomb body, in particular in the form of half shells. The power feed line is understood to mean an element by which an electrical connection can be produced with a power source. The conductor is an electrical plug and/or an electrical bushing. The power feed line can be connected or is connected electrically to the power distribution structure. The electrically heatable honeycomb body can contain a plurality of honeycomb structures, of which at least one can be heated electrically, in particular as what is referred to as a heated catalytic converter, upstream of a further honeycomb structure which is not directly heated electrically.

The embodiment of a PTC element as a closed-loop control element in the circuit, with which the electrically heatable honeycomb body and/or the heating catalytic converter are operated, permits, in an advantageous way, the formation of a self-regulating circuit so that it is possible to dispense with further control mechanisms for the electrically heatable honeycomb body or the mechanisms can be configured significantly more easily.

According to one advantageous embodiment of the honeycomb body according to the invention the power feed line contains a sleeve which is attached to the outside of the honeycomb body.

The sleeve is preferably joined in a gas-tight fashion to a casing pipe of the honeycomb body and, if appropriate, insulated electrically with respect to an electrical conductor which is located in the interior of the sleeve.

According to a further advantageous embodiment of the honeycomb body, the closed-loop control element is formed at least partially in the sleeve.

The sleeve can, in particular, provide protection against mechanical effects and can produce thermal contact with a fluid flowing through the honeycomb body, for example exhaust gas.

According to a further advantageous refinement of the honeycomb body, the closed-loop control element projects at least partially into the interior of the honeycomb body. A refinement in which the fluid can at least partially flow around the closed-loop control element is also particularly preferred.

This permits a very simple form of thermal contacting with the fluid flowing through the honeycomb body since the fluid flows directly past the closed-loop control element and heats it or cools it.

According to a further advantageous refinement of the honeycomb body, the closed-loop control element is formed from at least one of the following materials:

a) a titanate ceramic, and
b) a barium titanate ceramic.

According to a further aspect of the invention, a method is proposed for operating a honeycomb body through which a fluid can flow, which can be heated electrically and which contains at least one flow distribution structure which is connected to a power source in order to be supplied with power via a power feed line, the power supply being provided via at least one self-regulating closed-loop control element which is at least in thermal contact with the fluid.

In this context, the closed-loop control element which is formed in particular from a material with a positive temperature coefficient can be formed in the honeycomb body itself, in the power feed line and/or in the power distribution structure. The precondition is that current flows through the closed-loop control element when the honeycomb body which can be heated electrically is heated.

According to one advantageous refinement of the method according to the invention, the closed-loop control element has a closed-loop control temperature which corresponds to a temperature of the fluid which is higher than or equal to an activation temperature of at least one of the following components:

a) a catalytically active coating on at least parts of the honeycomb body; and b) at least one catalytically active coating of a structure for conditioning exhaust gas, which structure is formed downstream of the honeycomb body.

A structure is to be understood in particular as a honeycomb body which has a corresponding catalytically active coating. Possibility a) is to be understood here in particular as meaning that the electrically heatable honeycomb body contain two honeycomb structures which are formed one behind the other, wherein in particular one honeycomb structure is embodied as a heated catalytic converter through which electric current for heating purposes can flow. Furthermore, it is also possible for at least one of these honeycomb structures to contain a catalytically active coating in just one component area. The activation temperature (light off temperature) is understood to mean the temperature which is at least necessary for the catalytic reaction to take place. If, for example, a particle trap or a particle filter is formed as a further honeycomb structure in the electrically heatable honeycomb body, the activation temperature contains the regeneration temperature of the trap or of the filter.

According to a further advantageous embodiment of the method according to the invention, the fluid at least partially flows around the closed-loop control element.

The method according to the invention can be used, in particular, for operating a honeycomb body according to the invention. The details and advantages which are disclosed for the honeycomb body according to the invention can be transposed and applied to the method according to the invention, and vice versa.

Other features which are considered as characteristic for the invention are set forth in the appended claims.

Although the invention is illustrated and described herein as embodied in an electrically heatable honeycomb body and a method for operating it, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
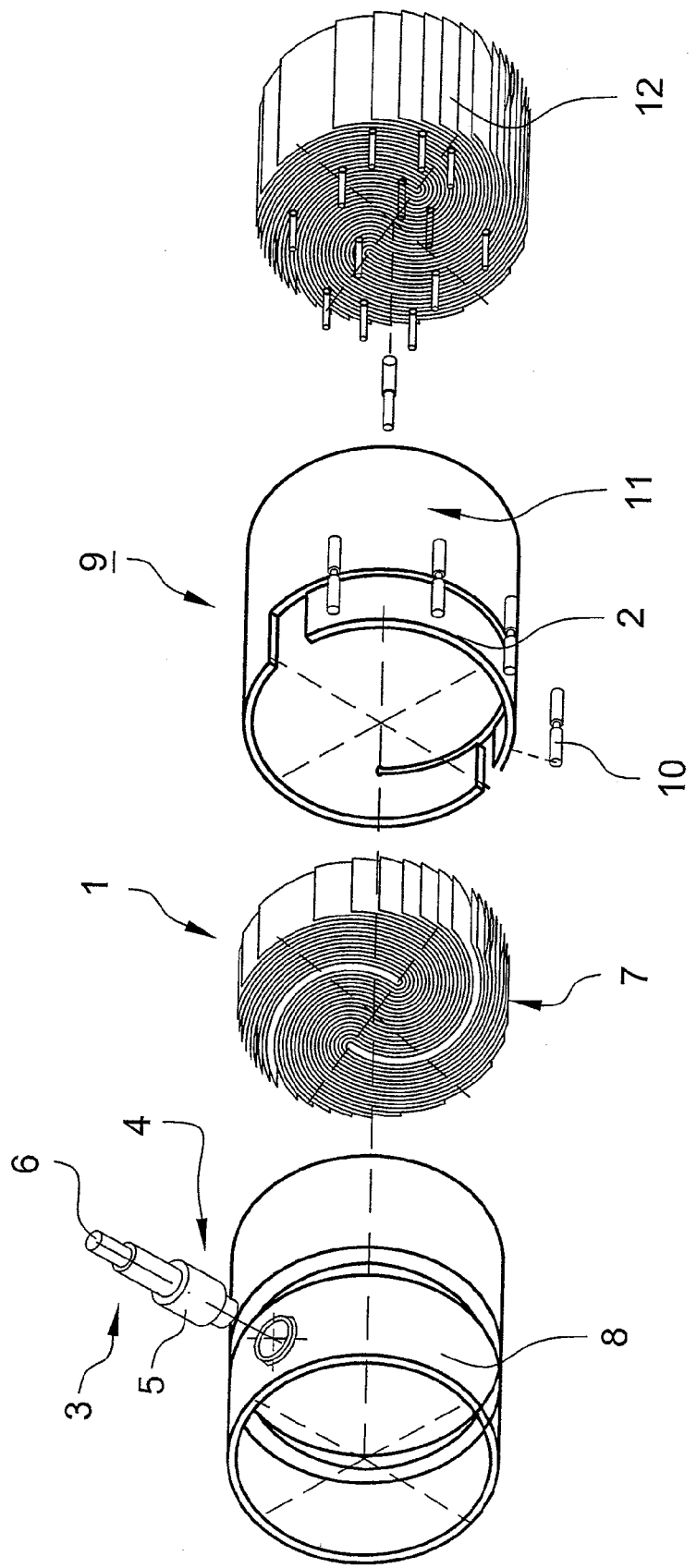
FIG. 1 is a diagrammatic, exploded, perspective view of a first exemplary embodiment of a honeycomb body according to the invention.

Referring now to the figures of the drawing in detail and first, particularly, to FIG. 1 thereof, there is shown a schematic view of a first exemplary embodiment of an electrically heatable honeycomb body 1. The latter contains a power distribution structure 2 and a power feed line 3. The power feed line 3 contains, in the first exemplary embodiment, a closed-loop control element 4 which is embodied in a sleeve 5. The power distribution structure 2 can be connected to a power source via an electrical conductor 6 and the closed-loop control element 4. As a result, the plate-shaped heated catalytic converter 7 can be heated through ohmic heat. The sleeve 5 is connected to an outer casing pipe 8 in a materially joined fashion.

An inner casing pipe 9 is formed in the outer casing pipe 8. The power distribution structure 2 is part of the inner casing pipe 9. The power distribution structure 2 is connected via insulating securing pins 10 to a remaining part 11 of the casing which also contains a further honeycomb structure 12. The further honeycomb structure 12 is heated indirectly via the heated catalytic converter 7 since during operation the exhaust gas, which flows through the heated catalytic converter 7, flows through the further honeycomb structure 12 and heats it. The further honeycomb structure 12 and the heated catalytic converter 7 are joined to one another by the insulating securing pins 10.

According to the invention, the closed-loop control element 4 is formed from a PTC material, that is to say a material with a positive temperature coefficient. This gives rise to a self-regulating configuration of the electrically heatable honeycomb body 1. In this context, a closed-loop control temperature of the closed-loop control element 4 is selected such that it corresponds to an activation temperature of a catalytic reaction, for example at the heated catalytic converter 7, the further honeycomb structure 12 and/or another structure for the conversion of exhaust gases. Correspond means here that the closed-loop control temperature of the closed-loop control element 4 is selected in such a way and/or it is installed at such a location that the closed-loop control temperature is present at the closed-loop control element 4 if the desired activation temperature is present at the corresponding structure.

Figure 2:
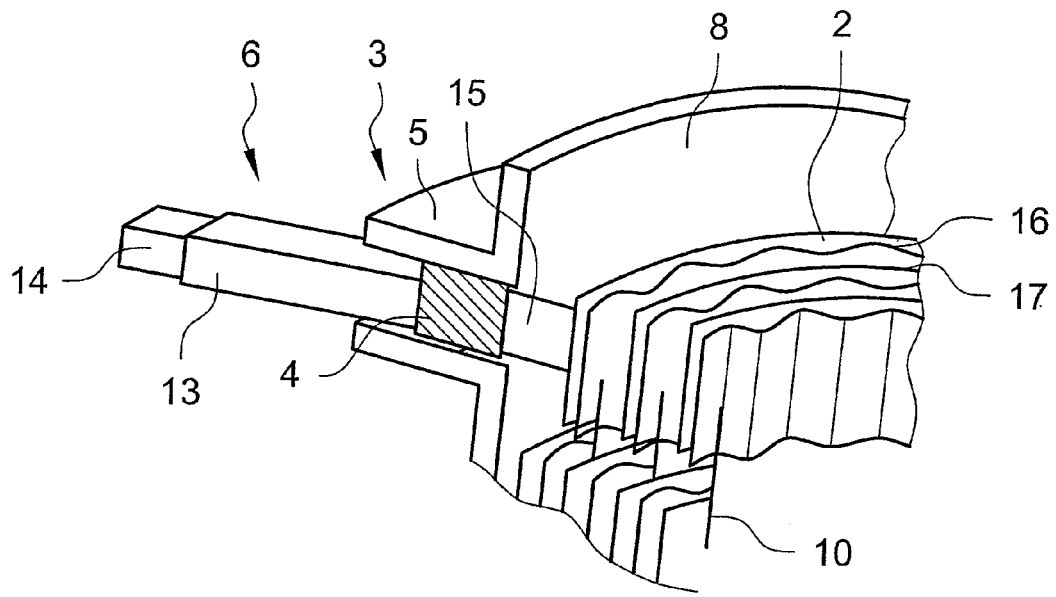
FIG. 2 is a diagrammatic, perspective view of a detail from the first exemplary embodiment of the honeycomb body according to the invention.

FIG. 2 is a schematic view of a detail from the first exemplary embodiment of the electrically heatable honeycomb body 1 according to the invention. The power feed line 3 is joined to the outer casing pipe 8 via the sleeve 5. In the sleeve, the closed-loop control element 4 is formed which can be connected to a power source, for example a generator and/or a battery, via the electrical conductor 6 containing a high-temperature-resistant insulating device 13 which is embodied in such a way that it can withstand the temperatures in the exhaust system of motor vehicles, and an internal conductor 14 in the interior of the insulating device 13. The closed-loop control element 4 is also connected via a conductor 15 to the power distribution structure 2. The heated catalytic converter 7 is formed here from corrugated metallic layers 16 and smooth metallic layers 17.

Figure 3:
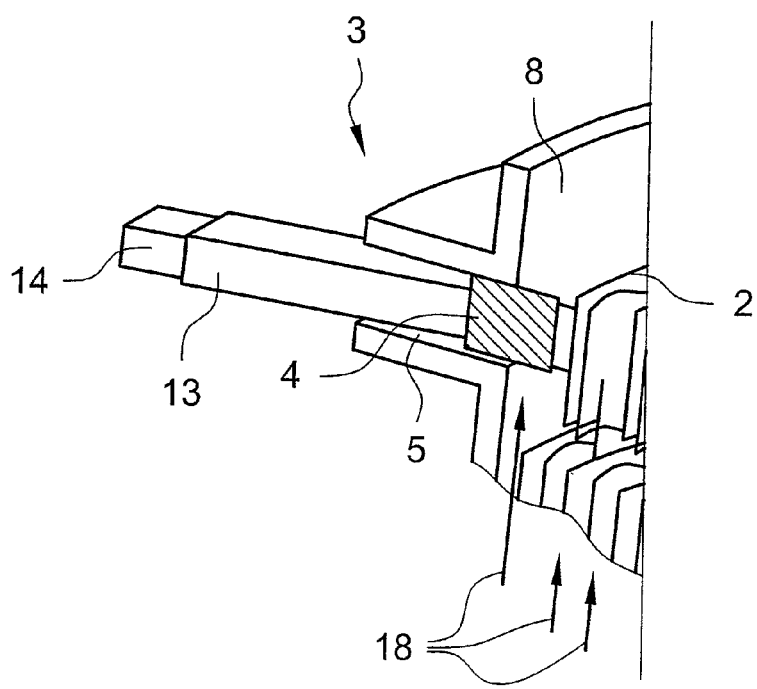
FIG. 3 is a diagrammatic, perspective view of a detail from a second exemplary embodiment of the honeycomb body according to the invention.

FIG. 3 is a schematic view of a detail of a second exemplary embodiment of the electrically heatable honeycomb element 1 according to the invention. In contrast to the first exemplary embodiment, the closed-loop control element 4 extrudes partially out of the sleeve 5 here and exhaust gas 18 can therefore at least partially flow around it. The closed-loop control element 4 is connected directly to the power distribution structure 2 here.

Figure 4:
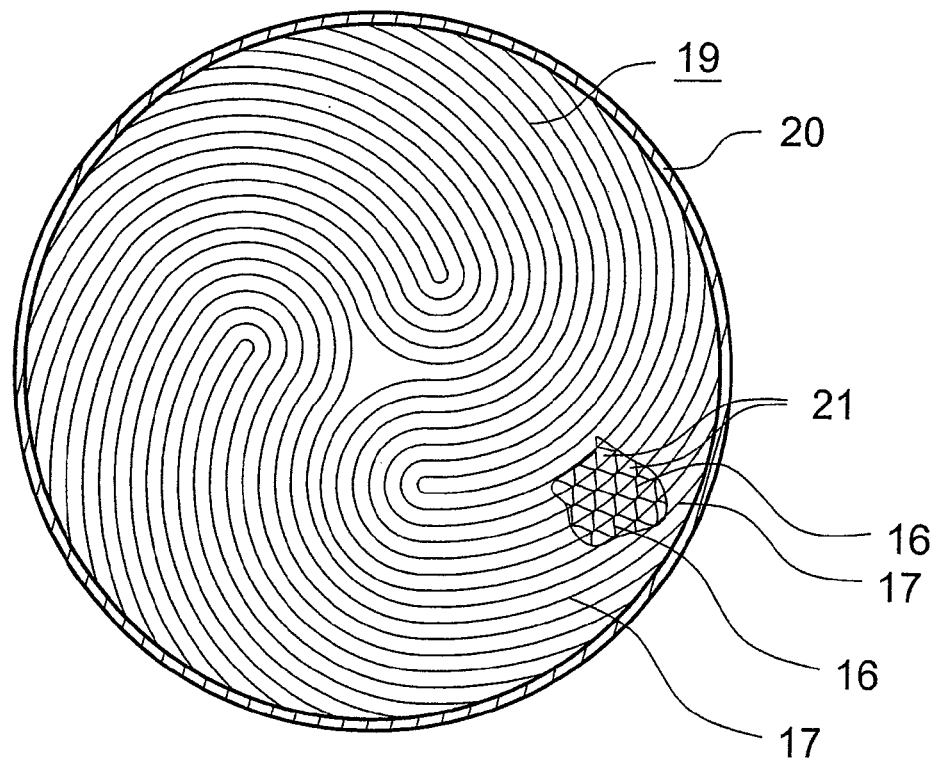
FIG. 4 is a diagrammatic, cross-sectional view through the honeycomb body.

FIG. 4 is a schematic view of an example of a honeycomb structure 19 in a casing pipe 20 constructed from corrugated metallic layers 16 and smooth metallic layers 17 which together form ducts 21, that is to say cavities through which a fluid, for example exhaust gas 18, can flow. Both the heated catalytic converter 7 and the further honeycomb structure 12 as well as further honeycomb structures can be embodied in the manner of this honeycomb structure 19. Alternatively or additionally it is possible to embody ceramic monolithic honeycomb structures in which, for example when it is used as a heated catalytic converter 7, a power distribution structure 2 is formed which causes the electric current to be distributed and therefore heats the heated catalytic converter 7. The further honeycomb structure 12, the heated catalytic converter and/or other honeycomb structures 19 in the exhaust system can be provided with catalytically active coatings, in particular at least one of the following coatings: a) oxidation catalytic converter coating; b) a coating which reduces the hydrolysis of a reducing agent precursor, for example urea, to a reducing agent, for example ammonia, and c) an SCR catalytic converter coating.

The electrically heatable honeycomb body 1 according to the invention permits, through the formation of a self-regulating closed-loop control element 4 composed, for example, of a PTC (positive temperature coefficient) material, a simple closed-loop control system for the heating power of the electrically heatable honeycomb body 1 to be implemented since the further open-loop or closed-loop control electronics can be significantly simplified or even dispensed with.

The invention claimed is:

1. An electrically heatable honeycomb unit, comprising:
   a honeycomb body being a catalytic converter and having cavities formed therein through which a fluid can flow;
   a power feed line having a sleeve attached to an outside of said honeycomb body;
   at least one power distribution structure, said power distribution structure being connected to a power source via said power feed line, said power distribution structure delimiting said honeycomb body; and
   at least one closed-loop control element made of a material with a positive temperature coefficient (PTC) and can be placed at least in thermal contact with the fluid flowing through said honeycomb body, said at least one closed-loop control element disposed only in at least one of said power feed line or said power distribution structure, said at least one closed-loop control element being formed at least partially in said sleeve, said closed-loop control element configured to trip and thus decrease a flow of current upon the fluid raising said closed-loop control element above a closed-loop control temperature.

2. The honeycomb unit according to claim 1, wherein said closed-loop control element projects at least partially into an interior of said honeycomb body.

3. The honeycomb unit according to claim 1, wherein the fluid can flow at least partially around said closed-loop control element.

4. The honeycomb unit according to claim 1, wherein said closed-loop control element is formed from at least one material selected from the group consisting of a titanate ceramic and a barium titanate ceramic.

5. A method for operating an electrically heatable honeycomb body through which a fluid can flow and contains at least one power distribution structure connected to a power source via a power feed line to supply the electrically heatable honeycomb body with power, which comprises the step of:
   providing a power supply via at least one self-regulating closed-loop control element being at least in thermal contact with the fluid, the self-regulating closed-loop control element conducting current to the electrically heatable honeycomb body for ohmically heating the electrically heatable honeycomb body being a catalytic converter; and
   tripping the self-regulating closed-loop control element to decrease the current flow upon the fluid raising the self-regulating closed-loop control element above a closed-loop control temperature.

6. The method according to claim 5, which further comprises setting the closed-loop control temperature of the closed-loop control element to correspond to a temperature of the fluid being higher than or equal to an activation temperature of at least one of the following components:
   a catalytically active coating on at least parts of the honeycomb body; and
   at least one catalytically active coating of a structure for conditioning exhaust gas, the structure being formed downstream of the honeycomb body.

7. The method according to claim 5, wherein the fluid at least partially flows around the closed-loop control element.

8. An electrically heatable honeycomb unit, comprising:
   a honeycomb body being a catalytic converter having cavities formed therein through which a fluid can flow;
   a power feed line;
   at least one power distribution structure, said power distribution structure being connected to a power source via said power feed line; and
   at least one closed-loop control element made of a material with a positive temperature coefficient (PTC) and can be placed at least in thermal contact with the fluid flowing through said honeycomb body, said at least one closed-loop control element configured to control a flow of current into said honeycomb body for heating said honeycomb body via ohmic heat, said closed-loop control element configured to trip and thus decrease the flow of current upon the fluid raising said closed-loop control element above a closed-loop control temperature.

* * * * *